United States Patent
Okayama et al.

(10) Patent No.: US 6,271,310 B1
(45) Date of Patent: Aug. 7, 2001

(54) POLYPROPYLENE COMPOSITION AND PROCESS FOR PRODUCING THE SAME

(75) Inventors: Chikashi Okayama; Takanori Nakashima; Akira Yamauchi; Jun Saito; Michitaka Sasaki, all of Chiba (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/402,998

(22) PCT Filed: Apr. 16, 1998

(86) PCT No.: PCT/JP98/01751
  § 371 Date: Oct. 15, 1999
  § 102(e) Date: Oct. 15, 1999

(87) PCT Pub. No.: WO98/46677
  PCT Pub. Date: Oct. 22, 1998

(30) Foreign Application Priority Data

Apr. 17, 1997 (JP) .................................................. 9-115246
Apr. 17, 1997 (JP) .................................................. 9-115247

(51) Int. Cl.⁷ ............................ C08F 8/00; C08L 23/00; C08L 23/04
(52) U.S. Cl. ........................................ 525/191; 525/240
(58) Field of Search ..................................... 525/191, 240

(56) References Cited

U.S. PATENT DOCUMENTS

| | | | |
|---|---|---|---|
| 4,128,606 | 12/1978 | Furutachi et al. | 525/240 |
| 4,734,459 | 3/1988 | Cecchin et al. | 525/247 |
| 5,286,552 | * 2/1994 | Lesca et al. | 428/220 |
| 5,744,086 | * 4/1998 | Hallam | 264/296 |

FOREIGN PATENT DOCUMENTS

| | | |
|---|---|---|
| 52-98045 | 8/1977 | (JP) . |
| 55-66939 | 5/1980 | (JP) . |
| 55-151047 | 11/1980 | (JP) . |
| 57-18751 | 1/1982 | (JP) . |
| 57-65740 | 4/1982 | (JP) . |

* cited by examiner

*Primary Examiner*—Nathan M. Nutter
(74) *Attorney, Agent, or Firm*—McDermott, Will & Emery

(57) ABSTRACT

A polypropylene composition which contains 0.01 to 5 parts by weight of an olefin (co)polymer (a) having an intrinsic viscosity of 15 to 100 dl/g, 100 parts by weight of a propylene homopolymer (b) having an intrinsic viscosity of 0.2 to 10 dl/g, and 28 to 300 parts by weight of an ethylene/propylene copolymer (c) having an intrinsic viscosity of 0.2 to 10 dl/g, and in which the ratio of the melt flow rate of the homopolymer (b) to that of the copolymer (c), $MFR_{PP}/MFR_{RC}$, is 0.3 to 4 and the product of the ratio of the intrinsic viscosity of the copolymer (c) to that of the homopolymer (b), $[\eta]_{RC}/[\eta]_{PP}$, and the weight ratio of the amount of the homopolymer (b) to that of the copolymer (c), $W_{PP}/W_{RC}$, is in the range of from 0.2 to 3.0. The composition has high melt tension, high crystallization temperature, and excellent thermal stability, and yields a molded article having excellent transparency, reduced molding shrinkage, and excellent resistance to whitening by impact or bending.

7 Claims, No Drawings

US 6,271,310 B1

POLYPROPYLENE COMPOSITION AND PROCESS FOR PRODUCING THE SAME

This application claims the benefit of PCT Application No. JP 98/01751, filed Apr. 16, 1998, which in turn claims the benefit of Japanese Priority Patent Application No. HEI 9-115246, filed Apr. 17, 1997 and Japanese Priority Patent Application No. HEI 9-115247, filed Apr. 17, 1997.

TECHNICAL FIELD

The present invention relates to a polypropylene composition which has high melt tension, a high crystallization temperature, and high thermal stability and which provides a molded article having excellent transparency, excellent resistance to whitening by impact or bending, and low molding shrinkage, as well as to a process for producing the composition.

BACKGROUND ART

Polypropylene has excellent mechanical properties, chemical resistance, and other properties, and is very useful in view of balance against economy. Therefore, polypropylene is widely applied to a variety of molding techniques. However, moldability of polypropylene with respect to techniques such as blow molding, expansion molding, and extrusion molding is insufficient due to low melt tension and low crystallization temperature. In addition, high-speed production of a molded object through other molding techniques is limited.

Although a crystalline propylene homopolymer has high rigidity, its impact resistance has a problem remained, particularly at low temperature. In order to mitigate this drawback, there has been proposed a composition produced by forming a crystalline propylene homopolymer and subsequently forming an ethylene-propylene copolymer (a so-called block copolymer). Although the composition has improved impact resistance as compared to the case of a crystalline propylene homopolymer, the block polymer still has drawbacks such as being highly prone to whitening by impact or bending; low transparency; and large molding shrinkage.

In view of the foregoing, an object of the present invention is to provide a polypropylene composition having high melt tension, a high crystallization temperature, and excellent thermal stability and providing a molded article having excellent transparency, reduced molding shrinkage, and excellent resistance to whitening by impact or bending to mitigate the above drawbacks. Another object of the present invention is to provide a process for producing the composition.

DISCLOSURE OF THE INVENTION

The present inventors have conducted earnest studies to solve the above problems, to thereby attain the present invention.

Accordingly, in a first mode of the present invention, there is provided a polypropylene composition comprising 0.01–5 parts by weight of an olefin (co) polymer (a), 100 parts by weight of a propylene homopolymer (b), and 28–300 parts by weight of an ethylene-propylene copolymer (c), wherein the product, $([\eta]_{RC}/[\eta]_{PP}) \times (W_{PP}/W_{RC})$, of the ratio of the intrinsic viscosity of the ethylene-propylene copolymer (c) to that of the propylene homopolymer (b) represented by $[\eta]_{RC}/[\eta]_{PP}$ and the ratio of the weight of propylene homopolymer (b) to that of the ethylene-propylene copolymer (c) represented by $W_{PP}/W_{RC}$ falls within the range of 0.2–3.0;

the olefin (co)polymer (a) having an intrinsic viscosity as measured in tetralin at 135° C. and represented by $[\eta]_E$ of 15–100 dl/g;

the propylene homopolymer (b) having an intrinsic viscosity as measured in tetralin at 135° C. and represented by $[\eta]_{PP}$ of 0.2–15 dl/g; and the ethylene-propylene copolymer (c) having an intrinsic viscosity as measured in tetralin at 135° C. and represented by $[\eta]_{RC}$ of 0.2–10 dl/g.

In a second mode of the present invention, there is provided a polypropylene composition as described in the first mode, wherein the ratio of the ethylene-propylene copolymer (c) to the propylene homopolymer (b) is 50–300 parts by weight/100 parts by weight; the ratio of the melt flow rate of the propylene homopolymer (b) to that of the ethylene-propylene copolymer (c) represented by $MFR_{PP}/MFR_{RC}$ is 0.3–4; and the product represented by $([\eta]_{RC}/[\eta]_{PP}) \times (W_{PP}/W_{RC})$ falls within the range of 0.2–2.0.

In a third mode of the present invention, there is provided a polypropylene composition as described in the first mode, wherein the ratio of the ethylene-propylene copolymer (c) to the propylene homopolymer (b) is 28–67 parts by weight/100 parts by weight; the ratio represented by $[\eta]_{RC}/[\eta]_{PP}$ is 0.7–1.2; and the product represented by $([\eta]_{RC}/[\eta]_{PP}) \times (W_{PP}/W_{RC})$ falls within the range of 1.0–3.0.

In a fourth mode of the present invention, there is provided a process for producing a polypropylene composition comprising the steps of:

forming 0.01–5 parts by weight of an olefin (co)polymer having an intrinsic viscosity as measured in tetralin at 135° C. and represented by $[\eta]_E$ of 15–100 dl/g (a) through (co)polymerization of ethylene or a mixture of ethylene and the other olefin;

forming 100 parts of a propylene homopolymer having an intrinsic viscosity as measured in tetralin at 135° C. and represented by $[\eta]_{RC}$ of 0.2–15 dl/g (b) through homopolymerization of propylene; and forming 28–300 parts by weight of an ethylene-propylene copolymer having an intrinsic viscosity as measured in tetralin at 135° C. and represented by $[\eta]_{RC}$ of 0.2–10 dl/g (c) through copolymerization of a mixture of ethylene and propylene, wherein the above steps are performed in the presence of a catalyst for producing polyolefin comprising a transition metal compound catalyst component containing at least a titanium compound, an organometallic compound of a metal selected from the group consisting of metals belonging to Group 1, Group 2, Group 12, and Group 13, and an optional electron donor, and the product, $([\eta]_{RC}/[\eta]_{PP}) \times (W_{PP}/W_{RC})$, of the ratio of the intrinsic viscosity of the ethylene-propylene copolymer (c) to that of the propylene homopolymer (b) represented by $[\eta]_{RC}/[\eta]_{PP}$ and the ratio of the weight of propylene homopolymer (b) to that of the ethylene-propylene copolymer (c) represented by $W_{PP}/W_{RC}$ falls within the range of 0.2–3.0.

In a fifth mode of the present invention, there is provided a process for producing a polypropylene composition as described in the fourth mode, wherein the organometallic compound is used in an amount of 0.01–1,000 mol per mol of transition metal atoms and the optional electron donor is used in an amount of 500 mol or less per mol of transition metal atoms.

In a sixth mode of the present invention, there is provided a process for producing a polypropylene composition as described in any one of the fourth mode and the fifth mode, comprising the steps of:

preliminarily polymerizing propylene and subsequently forming the olefin (co)polymer (a) through polymerization to thereby preliminarily activate a catalyst;

forming the propylene homopolymer (b); and subsequently forming the ethylene-propylene copolymer (c).

In a seventh mode of the present invention, there is provided a process for producing a polypropylene composition as described in the sixth mode, comprising the steps of:

forming the olefin (co)polymer (a) through polymerization to thereby preliminarily activate a catalyst;

addition-polymerizing propylene; and subsequently forming the propylene homopolymer (b).

BEST MODE FOR CARRYING OUT THE INVENTION

The modes for carrying out the present invention will next be described.

First of all, definitions of the notation shown in the description and mutual relations to the components of the polypropylene composition are described.

The polypropylene composition of the present invention comprises the following components:

a small amount of polypropylene (B) formed though a preliminary polymerization step (i);

an olefin (co)polymer (a) formed through a preliminary activation step for a catalyst (ii) (referred to as "polyethylene (A)" when the olefin (co)polymer is particularly polyethylene);

a small amount of polypropylene (D) formed through an addition polymerization step (iii);

polypropylene (b) formed through a homopolymerization step for propylene (iv) among the main (co)polymerization steps; and an ethylene-propylene copolymer (c) formed through a copolymerization step for ethylene and propylene (v) among the main (co)polymerization steps.

$W_1$: the weight of a formed polypropylene (B)

$W_{T2}$: the weight of formed polymers after preliminary activation $W_2(=W_{T2}-W_1)$: the weight of a formed polyethylene (A)

$W_E(=W_2)$: the weight of a formed olefin (co)polymer (a)

$W_3$: the weight of a formed polypropylene (D)

$W_{PP}$: the weight of a formed propylene homopolymer (b)

$W_{RC}$: the weight of a formed ethylene-propylene copolymer (c)

$W_{WHOLE}$: the weight of a formed polypropylene composition $[\eta]_B$: the intrinsic viscosity of a polypropylene (B)

$[\eta]_{T2}$: the intrinsic viscosity of polymers after preliminary activation $[\eta]_E$: the intrinsic viscosity of an olefin (co)polymer (a) (=polyethylene (A))

$[\eta]_{T3}$: the intrinsic viscosity of a polymer after addition polymerization $[\eta]_D$: the intrinsic viscosity of a polypropylene (D)

$[\eta]_{PP}$: the intrinsic viscosity of a propylene homopolymer (b)

$[\eta]_{E+PP}$: the intrinsic viscosity of a composition when an olefin (co)polymer (a) and a propylene homopolymer (b) are formed $[\eta]_{RC}$: the intrinsic viscosity of an ethylene-propylene copolymer (c)

$[\eta]_{WHOLE}$: the intrinsic viscosity of a polypropylene composition $MFR_E$: the melt flow rate of an olefin (co)polymer (a)

$MFR_{PP}$: the melt flow rate of a propylene homopolymer (b)

$MFR_{E+PP}$: the melt flow rate of a composition when an olefin (co)polymer (a) and a propylene homopolymer (b) are formed $MFR_{RC}$: the melt flow rate of an ethylene-propylene copolymer (c)

$MFR_{WHOLE}$: the melt flow rate of a polypropylene composition

Unless otherwise indicated, intrinsic viscosity refers to intrinsic viscosity as measured in tetralin at 135° C. and is represented simply by $[\eta]$.

The polypropylene composition of the present invention comprises 0.01–5 parts by weight of an olefin (co)polymer (a), 100 parts by weight of a propylene homopolymer (b), and 28–300 parts by weight of an ethylene-propylene copolymer (c).

In the above-described, especially, second mode of the present invention, there is provided a polypropylene composition having a ratio of an ethylene-propylene copolymer (c) to a propylene homopolymer (b) of 50–300 parts by weight/100 parts by weight and excellent resistance to whitening by impact.

In the above-described, especially, third mode of the present invention, there is provided a polypropylene composition having a ratio of an ethylene-propylene copolymer (c) to a propylene homopolymer (b) of 28–67 parts by weight/100 parts by weight and excellent resistance to whitening by bending.

There will next be described components constituting the polypropylene composition, as well as polypropylene compositions comprised of the components.

1. Olefin (co)polymer (a)

A suitable olefin (co)polymer (a) is a C2–C12 olefin homopolymer such as an ethylene homopolymer or an ethylene-olefin random copolymer containing ethylene monomer units in an amount of 50 wt. % or more (hereinafter may be referred to as "having an ethylene content of 50 wt. % or more"), preferably an ethylene homopolymer or an ethylene-olefin random copolymer containing ethylene monomer units in an amount of 70 wt. % or more, more preferably an ethylene homopolymer or an ethylene-olefin random copolymer containing ethylene monomer units in an amount of 90 wt. % or more. These (co)polymers may be used singly or in combination of two or more species.

No particular limitation is imposed on the olefins constituting the olefin (co)polymer (a), and a C2–C12 olefin is preferably used. Examples of the olefins include ethylene, propylene, 1-butene, 1-pentene, 1-hexene, 1-octene, 1-decene, 4-methyl-1-pentene, 3-methyl-1-pentene and so on. These olefins may be used singly or in combination of two or more species.

The intrinsic viscosity of the olefin (co)polymer (a) represented by $[\eta]_E$ is 15–100 dl/g, preferably 17–50 dl/g. Since the olefin (co)polymer (a) must have a high molecular weight corresponding to an intrinsic viscosity represented by $[\eta]_E$ of up to 15 dl/g, the ethylene monomer unit is preferably contained in an amount of 50 wt. % or more in view of the efficiency for increasing molecular weight.

When the intrinsic viscosity of the olefin (co)polymer (a) represented by $[\eta]_E$ is less than 15 dl/g, the formed polypropylene composition has poor melt tension and a low crystallization temperature. No particular upper limit is imposed on the intrinsic viscosity represented by $[\eta]_E$. However, when the difference between the intrinsic viscosity of the olefin (co)polymer (a) and the intrinsic viscosity of polypropylene (b) represented by $[\eta]_{PP}$ is great, dispersion of the olefin (co)polymer (a) into the polypropylene (b) in the polypropylene composition becomes poor, to thereby result in unsatisfactory increase of melt tension. Moreover, in view of production efficiency, the upper limit is preferably about 100 dl/g.

Although no particular limitation is imposed on the density of the olefin (co)polymer (a), illustratively, the density is preferably about 880–980 g/l.

2. Propylene Homopolymer (b)

In the first mode of the present invention, the propylene homopolymer (b) constituting the polypropylene composition is a crystalline propylene homopolymer having an intrinsic viscosity represented by $[\eta]_{PP}$ of 0.2–15 dl/g.

In the second mode of the present invention, the preferable propylene homopolymer (b) is a crystalline propylene homopolymer having an intrinsic viscosity represented by $[\eta]_{PP}$ of 0.2–10 dl/g. More preferably, a crystalline propylene homopolymer having an intrinsic viscosity of 0.5–8 dl/g is employed in the polypropylene composition, to thereby impart more excellent resistance to whitening by impact.

When the intrinsic viscosity of the propylene homopolymer (b) represented by $[\eta]_{PP}$ is less than 0.2 dl/g, the formed polypropylene composition has poor mechanical characteristics, whereas when it is in excess of 10 dl/g, the moldability of the polypropylene composition is deteriorated.

In the third mode of the present invention, the preferable propylene homopolymer (b) is a crystalline propylene homopolymer having an intrinsic viscosity represented by $[\eta]_{PP}$ of 0.2–15 dl/g. More preferably, a crystalline propylene homopolymer having an intrinsic viscosity of 0.5–8.0 dl/g is employed in the polypropylene composition, to thereby impart more excellent resistance to whitening by bending.

No particular limitation is imposed on the stereoregularity of the propylene homopolymer (b), and any polypropylene such that can achieve the object of the present invention may be used so long as it is a crystalline polypropylene. Specifically, the isotactic pentad fraction (mmmm) as measured through use of a $^{13}$C-NMR (nuclear magnetic resonance) spectrum is 0.80–0.99, preferably 0.85–0.99, more preferably 0.90–0.99.

The isotactic pentad fraction (mmmm) is an isotactic fraction per pentad unit of a polypropylene molecule chain and is measured through a $^{13}$C-NMR analysis proposed by A. Zambelli et. al (*Macromolecules* 6, 925 (1973)). Peaks in the spectrum are assigned in accordance with the result of assignment proposed by A. Zambelli et. al (*Macromolecules* 8, 687 (1975)). Specifically, it is measured by use of a 20 wt. % solution of a polymer dissolved in a mixture of o-dichlorobenzene/bromobenzene=8/2 (wt.) at 67.20 MHz and 130° C. For example, JEOL-GX270 NMR spectrometer (manufactured by JEOL Ltd.) is used as an apparatus for measurement.

3. Ethylene-propylene Copolymer (c)

The ethylene-propylene copolymer (c) constituting the polypropylene composition of the present invention is an ethylene-propylene copolymer having an intrinsic viscosity represented by $[\eta]_{RC}$ of 0.2–10 dl/g. In order to obtain a polypropylene composition having more excellent impact resistance, the ethylene-propylene copolymer preferably has an ethylene monomer unit in an amount of 25–65 wt. %, more preferably 30–65 wt. %, and further more preferably 30–55 wt. %.

The amount of the ethylene monomer unit in the ethylene-propylene copolymer (c) has a great effect on rigidity, softness, and impact resistance; in particular, impact resistance at low temperature and whitening resistance of a produced molded article. Excessive amounts of the ethylene monomer unit have an adverse effect on dispersibility of the ethylene-propylene copolymer into a propylene homopolymer, to thereby deteriorate characteristics of an obtained molded article, such as gloss.

The ethylene-propylene copolymer (c) which is employed has an intrinsic viscosity represented by $[\eta]_{RC}$ of 0.2–10 dl/g, preferably 0.5 dl/g–8 dl/g.

When the intrinsic viscosity represented by $[\eta]_{RC}$ is less than 0.2 dl/g, the formed polypropylene composition has poor mechanical characteristics, whereas when it is in excess of 10 dl/g, the moldability of the polypropylene composition is deteriorated.

4. Polypropylene Composition 4.1. Compositional Proportions

In the present invention, the polypropylene composition comprises the above-described propylene homopolymer (b) in an amount of 100 parts by weight; the olefin (co)polymer (a) in an amount of 0.01–5 parts by weight, preferably 0.02–2 parts by weight, particularly preferably 0.05–1 parts by weight; and the ethylene-propylene copolymer (c) in an amount of 28–300 parts by weight, preferably 28–200 parts by weight.

When the content of the olefin (co)polymer (a) is less than 0.01 parts by weight, the effect for improving melt tension of the obtained polypropylene composition is poor, whereas when the content is in excess of 5 parts by weight, an effect commensurate with the incorporation is not attained and homogeneity of the obtained polypropylene composition might be disadvantageously deteriorated.

More preferably, the content of the ethylene-propylene copolymer (c) is 28–200 parts by weight, in consideration of improving the impact resistance of the composition at low temperature and lowering fluidity of powder formed during continuous polymerization for producing the polypropylene composition.

When the content of the ethylene-propylene copolymer (c) is less than 28 parts by weight, the impact resistance of the composition at low temperature is poor, whereas when the content is in excess of 300 parts by weight, fluidity of powder formed during continuous polymerization for producing the polypropylene composition becomes insufficient.

The polypropylene composition used in the second mode of the present invention comprises the olefin (co)polymer (a) in an amount of 0.01–5 parts by weight, preferably 0.02–2 parts by weight; and the ethylene-propylene copolymer (c) in an amount of 50–300 parts by weight, preferably 60–200 parts by weight to 100 parts by weight of the propylene homopolymer (b), respectively.

The polypropylene composition used in the third mode of the present invention comprises the above-described propylene homopolymer (b) in an amount of 100 parts by weight; the olefin (co)polymer (a) in an amount of 0.01–5 parts by weight, preferably 0.02–2 parts by weight; and the ethylene-propylene copolymer (c) in an amount of 28–160 parts by weight, preferably 28–82 parts by weight, more preferably 28–67 parts by weight.

4.2. The Ratio of Intrinsic Viscosity and Ratio of Weight of the Components

The polypropylene composition of the present invention is compositionally characterized in that the product, $([\eta]_{RC}/[\eta]_{PP}) \times (W_{PP}/W_{RC})$, of the ratio of the intrinsic viscosity and the ratio of the weight both ratios with respect to the propylene homopolymer (b) and the ethylene-propylene copolymer (c), falls within the range of 0.2–3.0.

The product of ratio of the intrinsic viscosity and the ratio of weight of the above two polymers serves as an index for molding shrinkage of the polypropylene composition. When the product is small, the molding shrinkage ratio of the composition and the tear strength and resistance to weld marks of the obtained molding are improved but heat resistance and rigidity of the molded article are greatly deteriorated, whereas when the product is large, whitening resistance is deteriorated and effects for improving the target molding shrinkage ratio of the composition and the tear strength and resistance to weld marks of the obtained molding are not fully attained.

In the second mode of the present invention, the polypropylene composition is compositionally characterized in that the product represented by $([\eta]_{RC}/[\eta]_{PP}) \times (W_{PP}/W_{RC})$ falls within the range of 0.2–2.0, more preferably 0.3–1.9; if the melt flow rate of the propylene homopolymer (b) is represented by $MFR_{PP}$ and that of the ethylene-propylene copolymer (c) is represented by $MFR_{RC}$, the ratio of both represented by $MFR_{PP}/MFR_{RC}$ is 0.3–4, more preferably 0.3–3.5; and the intrinsic viscosity of the ethylene-propylene copolymer (c) represented by $[\eta]_{RC}$ is 0.2–10 dl/g, preferably 6.5 or less, more preferably 5.0 or less.

The polypropylene composition satisfying the above ranges is excellent in transparency, molding shrinkage ratio, and resistance to whitening by impact and bending.

In the third mode of the present invention, the ethylene-propylene copolymer (c) constituting the polypropylene composition is characterized in that the intrinsic viscosity represented by $[\eta]_{RC}$ is 1.7–2.8 dl/g; the intrinsic viscosity ratio to the intrinsic viscosity of the propylene homopolymer $[\eta]_{PP}$ represented by $[\eta]_{RC}/[\eta]_{PP}$ is 0.7–1.2, preferably 0.8–1.2; and the product thereof with a weight ratio $W_{PP}/W_{RC}$ of the propylene homopolymer (b) to the ethylene-propylene copolymer (c) represented by $([\eta]_{RC}/[\eta]_{PP}) \times (W_{PP}/W_{RC})$ falls within the range of 1.0–3.0.

The obtained polypropylene composition has excellent resistance to whitening by bending.

Generally speaking in the present invention, the intrinsic viscosity of the ethylene-propylene copolymer (c) represented by $[\eta]_{RC}$ influences molding cycle ability of the polypropylene composition, film-formability in manufacture of film, and mechanical properties of a molded article, such as rigidity and heat resistance. The ratio of intrinsic viscosity represented by $[\eta]_{RC}/[\eta]_{PP}$ influences dispersibility of the ethylene-propylene copolymer (c) into the propylene homopolymer (b). Although the mechanical properties of a molded article are enhanced as the intrinsic viscosity represented by $[\eta]_{RC}$ increases, the molding cycle ability of the polypropylene composition is lowered as the intrinsic viscosity increases. When the ratio represented by $[\eta]_{RC}/[\eta]_{PP}$ is excessively high or low, the obtained molded article exhibits large molding shrinkage ratio. When the ratio of intrinsic viscosity is excessively low, the molded article has poor impact resistance, whereas when it is excessively high, the effect for improving transparency of a molded article of the polypropylene composition is deteriorated to thereby fail to attain the target properties.

The ethylene-propylene copolymer (c) contains a 20° C.-xylene-soluble component in an amount of 80 wt. % or more based on the weight of the ethylene-propylene copolymer (c), preferably 85 wt. %.

4.3. Molecular Weight Distribution of the Composition, Q Value ($M_W/M_N$)

The polypropylene composition exhibits a covariant molecular weight distribution having a Q value of 5 or less, preferably 4.5 or less. When the molecular weight distribution is wider, the gloss of the obtained molded article decreases.

4.4. The Weight, Intrinsic Viscosity, and Melt Flow Rate of Components of the Composition When the polypropylene composition is produced through a continuous process, the olefin (co)polymer (a) is initially formed, and the intrinsic viscosity represented by $[\eta]_E$ and the melt flow rate $MFR_E$ of the olefin (co)polymer can be measured directly. However, the intrinsic viscosity represented by $[\eta]_{PP}$ and the melt flow rate $MFR_{PP}$ of the subsequently formed propylene homopolymer (b) cannot be measured directly, nor can the intrinsic viscosity represented by $[\eta]_{RC}$ and the melt flow rate $MFR_{RC}$ of the ethylene-propylene copolymer (c).

Thus, the intrinsic viscosity of the propylene homopolymer (b) represented by $[\eta]_{PP}$ can be obtained through measurement of the intrinsic viscosity of a composition represented by $[\eta]_{E+PP}$ when the olefin (co)polymer (a) and the propylene homopolymer (b) are formed; the weight of the formed olefin (co)polymer (a) in the composition represented by $W_E$; and the weight of the formed propylene homopolymer in the composition represented by $W_{PP}$, followed by calculation by use of the following equation.

$$[\eta]_{PP} = \{[\eta]_{E+PP} - (1 - W_{PP}/(W_E + W_{PP}))[\eta]_E\} / \{W_{PP}/(W_E + W_{PP})\} \quad \text{Equation 1}$$

The melt flow rate of the propylene homopolymer (b) represented by $MFR_{PP}$ can be obtained through measurement of the melt flow rate of a composition, represented by $MFR_{E+PP}$, when the olefin (co)polymer (a) and the propylene homopolymer (b) are formed, and followed by calculation by use of the following equation.

$$\log(MFR_{PP}) = \{\log(MFR_{E+PP}) - (1 - W_{PP}/(W_E + W_{PP}))\log(MFR_E)\} / \{W_{PP}/(W_E + W_{PP})\} \quad \text{Equation 2}$$

The amounts of the formed olefin (co)polymer (a) and the formed propylene homopolymer (b) can be obtained through a conventionally known method such as an infrared analysis method.

Next, the intrinsic viscosity of the ethylene-propylene copolymer (c) represented by $[\eta]_{RC}$ can be obtained through measurement of the intrinsic viscosity of the polypropylene composition of the present invention, represented by $[\eta]_{WHOLE}$; the weight of the formed ethylene-propylene copolymer (c) in the composition represented by $W_{RC}$; and the weight of the formed propylene composition represented by $W_{WHOLE}$, followed by calculation by use of the following equation.

$$[\eta]_{RC} = \{[\eta]_{WHOLR} - (1 - W_{RC}/(W_{WHOLE}))[\eta]_{PP}\} / \{W_{RC}/(W_{WHOLE})\} \quad \text{Equation 3}$$

The melt flow rate of the ethylene-propylene copolymer (c), represented by $MFR_{RC}$, can be obtained through measurement of the melt flow rate of the polypropylene composition, represented by $MFR_{WHOLE}$, and followed by calculation by use of the following equation.

$$\log(MFR)_{RC} = \{\log(MFR_{WHOLE}) - (1 - W_{RC}/(W_{WHOLE}))\log(MFR_{WHOLE})\} / \{W_{RC}/(W_{WHOLE})\} \quad \text{Equation 4}$$

5. Process for Producing the Polypropylene Composition

A variety processes may be adapted as the process for producing the polypropylene composition of the present invention, so long as the characteristics of the components and the compositional proportions of the components satisfy the above ranges. For example, there is described a process in which the catalyst for producing a polyolefin described below is preliminarily activated with an olefin to thereby produce a preliminarily activated catalyst, and propylene or propylene, ethylene, and an optional olefin are subjected to main (co)polymerization in the presence of the preliminarily activated catalyst.

5.1. Summary of the Polymerization Process

The polymerization process comprises the following steps:

preliminarily polymerizing a small amount of propylene or a mixture containing propylene and another olefin in the presence of the below-described catalyst for producing polyolefin (i);

subsequently (co)polymerizing ethylene or a mixture containing ethylene and another olefin to thereby form 0.01–5 parts by weight of an olefin (co)polymer (a) (ii);

addition-polymerizing a residual olefin and a small amount of propylene (iii);

polymerizing propylene alone in the presence of the thus-obtained preliminarily activated catalyst to thereby form 100 parts by weight of a propylene homopolymer (b) (iv); and (co)polymerizing propylene and a C2–C12 olefin to thereby form 28–300 parts by weight of an ethylene-propylene copolymer (c) (v).

The above steps (i) through (v) are respectively referred to as a preliminary polymerization step; an olefin (co)polymerization step carried out during a preliminary activation step of a catalyst; an addition polymerization step; a propylene homopolymerization step; and an ethylene-propylene copolymerization step. The steps (iv) and (v) are referred to as main (co)polymerization steps.

The polymerization process will next be described in detail.

5.2. Catalyst

The catalyst which is employed in the present invention is a catalyst for producing a polyolefin comprising a transition metal compound catalyst component containing at least a titanium compound; an organometallic compound of a metal selected from the group consisting of metals belonging to Group 1, Group 2, Group 12, and Group 13 of the periodic table (1991 version) (AL1) in an amount of 0.01–1,000 mol per mol of transition metal atoms; and an optional electron donor (E1) in an amount of 0–500 mol per mol of transition metal atoms.

5.2.1. Transition Metal Compound Catalyst

With regard to the transition metal compound catalyst component, there may be used any of known catalyst components which are proposed as catalysts for producing polyolefin and predominantly comprise a transition metal compound catalyst component essentially containing a titanium compound. Of these, a titanium-containing solid catalyst component is suitably used in view of industrial production.

With regard to the titanium-containing solid catalyst component, there have been proposed, for example, a titanium-containing solid catalyst component predominantly comprising a titanium trichloride composition (Japanese Patent Publication (kokoku) Nos. 56-3356, 59-28573, and 63-66323) and a titanium containing carrier-type-catalyst component which comprises titanium tetrachloride on a magnesium compound carrier and essentially contains titanium, magnesium, a halogen, and an electron donor (Japanese Patent Application (kokai) Nos. 62-104810, 62-104811, 62-104812, 57-63310, 57-63311, 58-83006, 58-138712, 3-119003, and 4-103604). All these components may be used.

5.2.2. Organometallic Compound (AL1)

The organometallic compound (AL1) is an organic group-containing compound of a metal selected from the group consisting of metals belonging to Group 1, Group 2, Group 12, and Group 13 in the periodic table (1991 version). Examples of the organometallic compounds include organolithium compounds, organosodium compounds, organomagnesium compounds, organozinc compounds, and organoaluminum compounds, and these organometallic compounds may be used in combination with the aforementioned transition metal compound catalyst components.

Particularly, there are preferably used organoaluminum compounds having a general formula represented by $AlR^1_p R^2_q X_{3-(p+q)}$ wherein each of $R^1$ and $R^2$, which may be identical to or different from each other, represents a hydrocarbon group such as an alkyl group, a cycloalkyl group, or an aryl group and an alkoxyl group; X represents a halogen atom; and each of p and q represents a positive number that satisfies the following relationship, $0<p+q\leq 3$.

Examples of the organoaluminum compounds include trialkylaluminums such as trimethylaluminum, triethylaluminum, tri-n-propylaluminum, tri-n-butylaluminum, tri-i-butylaluminum, tri-n-hexylaluminum, tri-i-hexylaluminum, and tri-n-octylaluminum; dialkylaluminum monohalides such as diethylaluminum chloride, di-n-propylaluminum chloride, di-i-butylaluminum chloride, diethylaluminum bromide, and diethylaluminum iodide; dialkylaluminum hydrides such as diethylaluminum hydride; alkylaluminum sesquihalides such as ethylaluminum sesquichloride; monoalkylaluminum dihalides such as ethylaluminum dichloride; and alkoxyalkylaluminums such as diethoxymonoethylaluminum. Of these, trialkylaluminums and dialkylaluminum monohalides are preferably used. They may be used singly or in combination of two or more species.

5.2.3. Electron Donor (E1)

In the production of the polypropylene composition of the present invention, in accordance with needs an electron donor (E1) may be used for controlling the rate of generation and/or stereoregularity of polyolefin.

Examples of the electron donor (E1) include organic compounds containing any atom selected from among an oxygen atom, a nitrogen atom, a sulfur atom, and a phosphorus atom in the molecule, such as ethers, alcohols, esters, aldehydes, carboxylic acids, ketones, nitriles, amines, amides, ureas, thioureas, isocyanates, azo-compounds, phosphines, phosphites, phosphinates, hydrogen sulfide, thioethers, and thioalcohols; silanols; and organosilicon compounds containing an Si—O—C bond.

Examples of the ethers include dimethyl ether, diethyl ether, di-n-propyl ether, di-n-butyl ether, di-i-amyl ether, di-n-pentyl ether, di-n-hexyl ether, di-i-hexyl ether, di-n-octyl ether, di-i-octyl ether, di-n-dodecyl ether, diphenyl ether, ethylene glycol monoethyl ether, diethylene glycol dimethyl ether, and tetrahydrofuran. Examples of the alcohols include methanol, ethanol, propanol, butanol, pentanol, hexanol, octanol, 2-ethylhexanol, allyl alcohol, benzyl alcohol, ethylene glycol, and glycerin. Examples of the phenols include phenol, cresol, xylenol, ethyl phenol, and naphthol.

Examples of the esters include monocarboxylic acid esters such as methyl methacrylate, methyl formate, methyl acetate, methyl butyrate, ethyl acetate, vinyl acetate, n-propyl acetate, i-propyl acetate, butyl formate, amyl acetate, n-butyl acetate, octyl acetate, phenyl acetate, ethyl propionate, methyl benzoate, ethyl benzoate, propyl benzoate, butyl benzoate, octyl benzoate, 2-ethylhexyl benzonate, methyl toluylate, ethyl toluylate, methyl anisate, ethyl anisate, propyl anisate, phenyl anisate, ethyl cinnamate, methyl naphthoate, ethyl naphthoate, propyl naphthoate, butyl naphthoate, 2-ethylhexyl naphthoate, and ethyl phenylacetate; aliphatic polycarboxylic acid esters such as diethyl succinate, diethyl methylmalonate, diethyl butylmalonate, dibutyl maleate, and diethyl butylmaleate; and aromatic polycarboxylic acid esters such as monomethyl phthalate, dimethyl phthalate, diethyl phthalate, di-n-propyl phthalate, mono-n-butyl phthalate, di-n-butyl phthalate, di-i-butyl phthalate, di-n-heptyl phthalate, di-2-ethylhexyl phthalate, di-n-octyl phthalate, diethyl i-phthalate, dipropyl i-phthalate, dibutyl i-phthalate, di-2-ethylhexyl i-phthalate, diethyl terephthalate, dipropyl terephthalate, dibutyl terephthalate, and di-i-butyl naphthalenedicarboxylate.

Examples of the aldehydes include acetaldehyde, propionaldehyde, and benzaldehyde. Examples of the carboxylic acids include monocarboxylic acids such as formic acid, acetic acid, propionic acid, butyric acid, oxalic acid, succinic acid, acrylic acid, maleic acid, valeric acid, and benzoic acid; and acid anhydrides such as benzoic anhydride, phthalic anhydride, and tetrahydrophthalic anhydride. Examples of ketones include acetone, methyl ethyl ketone, methyl i-butyl ketone, and benzophenone.

Examples of the nitrogen-containing compounds include nitriles such as acetonitrile and benzonitrile; amines such as methylamine, diethylamine, tributylamine, triethanolamine, β-(N,N-dimethylamino)ethanol, pyridine, quinoline, α-picoline, 2,4,6-trimethylpyridine, 2,2,5,6-tetramethylpiperidine, 2,2,5,5-tetramethylpyrrolidine, N,N,N',N'-tetramethylethylenediamine, aniline, and dimethylaniline; amides such as formamide, hexamethylphosphoric acid triamide, N,N,N',N',N"-pentamethyl-N'-β-dimethylaminomethylphosphoric acid triamide, and octamethylpyrophosphoramide; ureas such as N,N,N',N'-tetramethylurea; isocyanates such as phenyl isocyanate and toluyl isocyanate; and azo-compounds such as azobenzene.

Examples of the phosphorus-containing compounds include phosphines such as ethylphosphine, triethylphosphine, di-n-octylphosphine, tri-n-octylphosphine, triphenylphosphine, and triphenylphosphine oxide; phosphites such as dimethyl phosphite, di-n-octyl phosphite, triethyl phosphite, tri-n-butyl phosphite, and triphenyl phosphite; and phosphinates such as methyldimethylphosphinate and methyldiethylphosphinate.

Examples of the sulfur-containing compounds include thioethers such as diethyl thioether, diphenyl thioether, and methyl phenyl thioether; and thioalcohols such as ethyl thioalcohol, n-propyl thioalcohol, and thiophenol. Examples of the organosilicon compounds include silanols such as trimethylsilanol, triethylsilanol, and triphenylsilanol; and organosilicon compounds having an Si—O—C bound include such as trimethylmethoxysilane, dimethyldimethoxysilane, methylphenyldimethoxysilane, diphenyldimethoxysilane, methyltrimethoxysilane, vinyltrimethoxysilane, phenyltrimethoxysilane, trimethylethoxysilane, dimethyldiethoxysilane, diisoproryldimethoxysilane, diisobutyldimethoxysilane, diphenyldiethoxysilane, methyltriethoxysilane, ethyltriethoxysilane, vinyltriethoxysilane, butyltriethoxysilane, phenyltriethoxysilane, ethyltriisopropoxysilane, vinyltriacetoxysilane, cyclopentylmethyldimethoxysilane, cyclopentyltrimethoxysilane, dicyclopentyldimethoxysilane, cyclohexylmethyldimethoxysilane, cyclohexyltrimethoxysilane, dicyclohexyldimethoxysilane, and 2-norbornylmethyldimethoxysilane.

These electron donors may be used singly or in combination of two or more species.

5.3. Preliminary Activation of a Catalyst

In order to activate the molecular-weight-increasing activity of a catalyst for producing polyolefin, preliminary (co) polymerization of olefin in the presence of the above catalyst is performed as preliminary activation prior to homopolymerization of propylene and copolymerization of ethylene and propylene.

Specifically, a process of preliminary activation treatment comprises a step of preliminarily (co)polymerizing polypropylene or propylene and another olefin to form polypropylene (B) similar to the (co)polymers obtained through the target main (co)polymerization, and a step of preliminarily copolymerizing ethylene or ethylene and another olefin for preliminary activation in the presence of a catalyst for producing polyolefin. The catalyst for producing polyolefin comprises a combination of the above-described transition metal compound catalyst component containing at least a titanium compound, an organometallic compound (AL1), and an optional electron donor (E1). Thus, a preliminarily activated catalyst is produced through formation of polypropylene (B) and polyethylene (A) on the transition metal compound catalyst component.

The catalyst for producing polyolefin which is used in the above preliminary activation treatment comprises a transition metal compound catalyst component containing a titanium compound; an organometallic compound (AL1) in an amount of 0.01–1,000 mol, preferably 0.05–500 mol, per mol of transition metal contained in the catalyst component; and an optional electron donor (E1) in an amount of 0–500 mol, preferably 0–100 mol, per mol of transition metal contained in the catalyst component.

The amount of the catalyst for producing polyolefin as reduced to the transition metal atoms contained in the catalyst component is 0.001–5,000 mmol, preferably 0.01–1,000 mmol, per liter of the (co)polymerization volume of ethylene or ethylene and another olefin. The propylene or mixture of propylene and another olefin which is to be (co)polymerized through main (co)polymerization is fed in an amount of 0.01–500 g so as to be preliminarily (co)polymerized to form polypropylene (B) in an amount of 0.01–100 g per g of the transition metal compound catalyst component and, subsequently, the ethylene or a mixture of ethylene and another olefin which is to be (co)polymerized is fed in an amount of 0.01–10,000 g so as to be preliminarily (co)polymerized for preliminary activation to form polyethylene (A) in an amount of 0.01–5,000 g per g of the transition metal compound catalyst component, in the presence of the above catalyst and in the absence of a solvent or in the presence of a solvent in a volume of not more than 100 l per g of the transition metal compound catalyst component. Thus, polypropylene (B) and polyethylene (A) are formed to coat on the transition metal compound catalyst component.

5.3.1. Polypropylene (B) Obtained Through Preliminary Polymerization

The polypropylene (B) is a component for imparting dispersibility of the polyethylene (A) into a finally obtained polypropylene composition. Therefore, the intrinsic viscosity represented by $[\eta]_B$ is preferably lower than that of the polyethylene (A) represented by $[\eta]_E$ and is preferably greater than that of the finally obtained polypropylene composition represented by $[\eta]_{WHOLE}$.

Briefly, the polypropylene (B) has an intrinsic viscosity represented by $[\eta]_B$ of less than 15 dl/g and has a composition identical to that of the propylene homopolymer (b) as the target polymer. Finally, it is incorporated into the propylene homopolymer (b) serving as a component of the polypropylene composition of the present invention.

The amount of the polypropylene (B) formed on 1 g of the transition metal compound catalyst component is preferably 0.01–100 g; i.e., 0.01–1 wt. % based on the finally obtained polypropylene composition. When the amount of the polypropylene (B) is excessively low, dispersion of the polyethylene (A) into a target polypropylene composition is poor, whereas when the amount is excessively high, dispersion of the polyethylene (A) into the polypropylene composition is no longer enhanced, to thereby lower the production efficiency of a preliminarily activated catalyst.

5.3.2. Polyethylene (A) Obtained Through Polymerization for Preliminary Activation The above-described polyethylene (A) (i.e., olefin (co) polymer (a)) is an ethylene homopolymer or a copolymer of ethylene and a C3–C12 olefin having an ethylene unit content of 50 wt. % or more, preferably 70 wt. % or more, more preferably 90 wt. % or more. The polyethylene (A) is formed on the transition metal compound catalyst component in an amount of 0.01–5,000 g, preferably 0.05–2,000 g, more preferably 0.1–1,000 g per gram of the catalyst component and has an intrinsic viscosity as represented by $[\eta]_a$ of 15–100 dl/g, preferably 17–50 dl/g.

When the amount of the polyethylene (A) formed on 1 g of the transition metal compound catalyst component is less than 0.01 g, the improvement effect of the melt tension of the polypropylene composition finally obtained through main (co)polymerization is insufficiently enhanced, whereas when the amount is in excess of 5,000 g, the effect is not remarkable and the homogeneity of the finally obtained polypropylene composition might be disadvantageously deteriorated.

5.3.3. Polymerization for Preliminary Activation

In the present description, the term "polymerization volume" refers to the volume of a liquid phase in a polymerization reactor in the case of liquid phase polymerization, or the volume of a gas phase in a polymerization reactor in the case of gas phase polymerization.

The transition metal compound catalyst component is preferably used in an amount falling within the above-described range, in that an effective and controlled (co) polymerization rate of propylene is maintained. When the amount of the organometallic compound (AL1) is excessively low, the (co)polymerization rate decreases, whereas when the amount is excessively high, increase of the (co) polymerization rate commensurate with the amount may not be attained and the finally obtained polypropylene composition disadvantageously contains a large amount of the residual organometallic compound (AL1). Furthermore, When the electron donor (E1) is used in an excessive amount, the (co)polymerization rate decreases. When a solvent is used in an excessive amount, a large-scale reactor is required and effective control and maintenance of the (co)polymerization rate become difficult.

The preliminary activation treatment may be carried out in a liquid phase employing a solvent; e.g., an aliphatic hydrocarbon such as butane, pentane, hexane, heptane, octane, i-octane, decane, or dodecane; an alicyclic hydrocarbon such as cyclopentane, cyclohexane, or methylcyclohexane; an aromatic hydrocarbon such as toluene, xylene, or ethylbenzene; an inactive solvent such as a gasoline fraction or hydrogenated diesel fuel oil; or olefin itself; as well as in a gas phase without employing a solvent.

Although the preliminary activation treatment may be carried out in the presence of hydrogen, use of no hydrogen is preferred in order to form a high-molecular weight polyethylene (A) having an intrinsic viscosity as represented by $[\eta]_E$ of 15–100 dl/g.

In the preliminary activation treatment, preliminary (co) polymerization of propylene or a mixture of propylene and another olefin that is a target of the main (co)polymerization of the invention may be carried out under any set of conditions so long as the polypropylene (B) is formed in an amount of 0.01–100 g per gram of the transition metal compound catalyst component. Typically, the preliminary (co)polymerization is carried out in a temperature range from −40° C. to 100° C. at 0.1–5 MPa for one minute to 24 hours.

(Co)polymerization of ethylene or a mixture of ethylene and another olefin for preliminary activation may be carried out under arbitrary conditions, so long as the polyethylene (A) is formed in an amount of 0.01–5,000 g per gram of the transition metal compound catalyst component, preferably 0.05–2,000 g, more preferably 0.1–1,000 g. Typically, the (co)polymerization for preliminary activation is carried out in a relatively low temperature range from −40° C. to 40° C. preferably −40° C. to 30° C., more preferably −40° C. to 20° C., at 0.1–5 Mpa, preferably 0.2–5 Mpa, more preferably 0.3–5 Mpa for one minute to 24 hours, preferably 5 minutes to 18 hours, more preferably 10 minutes to 12 hours.

5.3.4. Addition Polymerization After Polymerization for Preliminary Activation

After the above-described preliminary activation treatment, in order to prevent lowering of the activity of main (co)polymerization caused by preliminary activation treatment, addition polymerization of propylene or a mixture of propylene and another olefin which is a target of the main polymerization of the invention may be carried out so as to form the polypropylene (D) in an amount of 0.01–100 g per gram of the transition metal compound catalyst component.

In this case, the organometallic compound (AL1), electron donor (E1), solvent, and propylene or the mixture of propylene and another olefin may be used in amounts similar to those employed in polymerization of ethylene or a mixture of ethylene and another olefin for preliminary activation. Preferably, the addition polymerization is carried out in the presence of an electron donor in an amount of 0.005–10 mol per mol of transition metal atoms, preferably 0.01–5 mol, within a temperature range from −40° C. to 100° C. at 0.1–5 MPa for 1 minute to 24 hours.

In addition polymerization, there may be employed an organometallic compound (AL1), an electron donor (E1), and a solvent which are similar to those employed in polymerization of ethylene or a mixture of ethylene and another olefin for preliminary activation. Propylene or the mixture of propylene and another olefin which is subjected to addition polymerization has a composition similar to that of propylene or the mixture of propylene and another olefin which is a target of the main polymerization of the invention. The addition-polymerized polypropylene (D) has an intrinsic viscosity as represented by $[\eta]_D$ which is lower than the intrinsic viscosity of the polyethylene (A) represented by $[\eta]_E$ and is finally incorporated into a main-(co)polymerized polypropylene of component(b).

5.4. Main Polymerization

The thus-obtained preliminarily activated catalyst may be used as is or in combination with an additional organometallic compound (AL2) and electron donor (E2) as a catalyst for main (co)polymerization in main homopolymerization of propylene and main copolymerization of propylene and ethylene in order to obtain a target polypropylene composition.

The catalyst for main (co)polymerization of olefin comprises the above preliminarily activated catalyst; the organometallic compound (AL2) in an amount such that the sum of the amount of the organometallic compound AL1 in the preliminarily activated catalyst and the amount of organometallic compound AL2 (AL1+AL2) is 0.05–3,000 mol per mol of transition metal atoms in the preliminarily activated catalyst, preferably 0.1–1,000 mol; and the electron donor (E2) in an amount such that the sum of the amount of electron donor E1 in the preliminarily activated catalyst and the amount of electron donor E2 (E1+E2) is 0–5,000 mol per mol of transition metal atoms in the preliminarily activated catalyst, preferably 0–3,000 mol.

When the amount of the organometallic compounds (AL1+AL2) is excessively low, the (co)polymerization rate of propylene or another olefin in the main (co) polymerization is too low, whereas when the amount is excessively high, the (co)polymerization rate does not efficiently increase commensurate with the amount and the finally obtained polypropylene composition might disadvantageously contain a large amount of the residual organometallic compounds. Furthermore, when the amount of the electron donors (E1+E2) is excessive, the (co) polymerization rate decreases drastically.

The organometallic compound (AL2) and the electron donor (E2) which are optionally added to the catalyst for main (co)polymerization of olefin may be similar to the above-described organometallic compound (AL1) and electron donor (E1), respectively, and may be used singly or in combination of two or more species. Furthermore, they may be identical to or different from the species employed in the preliminary activation treatment.

The catalyst for main (co)polymerization of olefin may comprise powdery grains which are obtained by removing a solvent remaining in the above preliminarily activated catalyst, unreacted olefin, the organometallic compound (AL1), the electron donor (E1), etc. through filtration or decanting, or may comprise a suspension of the powdery grains containing a solvent, an additional organometallic compound (AL2), and an optional electron donor (E2). Alternatively, the catalyst for main (co)polymerization of olefin may be produced by removing a remaining solvent and unreacted olefin through distillation under reduced pressure evaporation or by use of an inert gas or the like to thereby obtain powdery grains, and combining the powdery grains or a suspension of the powdery grains containing a solvent with an optional organometallic compound (AL2) and an optional electron donor (E2).

In the method of the main polymerization, the above-described preliminarily activated catalyst or the catalyst for main (co)polymerization is employed in an amount of 0.001–1,000 mmol as reduced to transition metal atoms in the preliminarily activated catalyst per liter of polymerization volume, preferably 0.005–500 mmol. By employing the transition metal compound catalyst component in an amount falling within the above-described range, an effective and controlled (co)polymerization rate of propylene alone or a mixture of propylene and ethylene is maintained.

Any (co)polymerization processes known in the art may be employed in the homopolymerization step of propylene (iv) and copolymerization step of propylene and ethylene (v) of the present invention. Examples include a slurry polymerization process in which (co)polymerization of olefin is carried out in an aliphatic hydrocarbon such as propane, butane, pentane, hexane, heptane, octane, i-octane, decane, or dodecane; an alicyclic hydrocarbon such as cyclopentane, cyclohexane, or methylcyclohexane; an aromatic hydrocarbon such as toluene, xylene, or ethylbenzene; or in inactive solvents such as a gasoline fraction or a hydrogenated diesel oil fraction; a bulk polymerization process employing olefin itself as a solvent; a gas phase polymerization process in which (co)polymerization of olefin is carried out in a gas phase; a solution polymerization process in which polyolefin formed through (co)polymerization is liquid; and a process in which two or more of the above processes are combined.

A slurry polymerization process and a bulk polymerization process may be employed for the homopolymerization of propylene of the present invention. However, since successive copolymerization of propylene and ethylene is preferably carried out through gas phase polymerization, gas phase polymerization is preferably employed for the homopolymerization of propylene.

When any of the above polymerization processes is employed, the polymerization is carried out in a continuous, semi-continuous, or batch manner at a polymerization temperature of 20–120° C., preferably 30–100° C., particularly preferably 40–100° C., at a polymerization pressure of 0.1–5 MPa, preferably 0.3–5 MPa, for a polymerization time of about 5 minutes to 24 hours. By employing the above polymerization conditions, the propylene homopolymer of the component (b) and the ethylene-propylene copolymer of the component (c) can be formed at high efficiency and at a controlled reaction rate.

5.5. Post-treatment After Main Polymerization

After completion of main (co)polymerization, the target polypropylene composition having a high melt tension can be obtained through optional post-treatment, including a known step for deactivating a catalyst, a step for removing a residual catalyst, and drying step.

6. Summary of the Process for Producing the Polypropylene Composition

In a particularly preferred embodiment of the process for producing the polypropylene composition used in the present invention, polymerization conditions are selected such that the intrinsic viscosity of the propylene homopolymer of the component (b), the ethylene-propylene copolymer of the component (c), and the finally obtained polypropylene composition formed in the main (co)polymerization represented by $[\eta]_{WHOLE}$ is 0.2–10 dl/g, preferably 0.7–5 dl/g, and the obtained polypropylene composition contains the polyethylene (A) attributed to the preliminarily activated catalyst in an amount of 0.01–5 wt. %. As in the case of a known process of polymerization of olefin, hydrogen is employed during polymerization so as to regulate the molecular weight of the obtained (co)polymer.

In the process for producing the polypropylene composition used in the present invention, the high-molecular-weight polyethylene (A) is formed in the preliminary activation step, and is homogeneously dispersed in the finally obtained polypropylene composition. Therefore, a required amount of a preliminarily activated catalyst can be prepared at a single time, and main (co)polymerization of propylene or another olefin is carried out through a customary (co) polymerization of olefin. Thus, the process of the present invention can maintain productivity comparable with that of a customary production process for polyolefin.

Japanese Patent Application Laid-Open (kokai) No. 8-27238 discloses a specific process for producing a propylene homopolymer of the component (b) and an ethylene-propylene copolymer of the component (c), which are formed in the main polymerization.

EXAMPLES

The present invention will next be described in detail by way of example, which should not be construed as limiting the invention thereto. Definitions of terms used in Examples and Comparative Examples and methods employed for measurement are as follows:

average particle diameter of a titanium-containing solid catalyst component (μm): calculated from grain size distribution as measured by use of a sizer (Master Sizer; manufactured by MALVERN Co.);

amount of a formed polymer per unit weight of a catalyst: the weight of Mg per unit weight of a sample was measured through inductively coupled plasma emission spectroanalysis (the ICP method);

ethylene unit content (wt. %): measured through infrared absorption spectrometry;

melt flow rate MFR (g/10 minutes): measured based on JIS K6760;

molecular weight distribution (Q value) Mn/Mw: measured by use of a GPC apparatus WP (Gel Permeation Chromatograph, Model 150C, manufactured by Waters Co.; column used: TSK GEL GMH6-HT) for a sample dissolved in o-dichlorobenzene at 135° C.;

20° C. xylene-soluble component (wt. %): measured based on ISO/JIS 1873-1;

intrinsic viscosity [η] (dl/g): measured by use of an Ostwald's automated viscometer (manufactured by Mitsui Toatsu Chemicals, Inc.) at 135° C. in tetralin; and melt tension MS (cN): measured by use of a melt tension tester Model 2 (manufactured by Toyo Seiki Seisakusho).

Examples 1 Through 6

(1) Preparation of a Transition Metal Compound Catalyst Component

MgCl$_2$ anhydrate (95.3 g) and dry EtOH (352 ml) were placed in an SUS-made autoclave from which air had been purged by use of nitrogen. The mixture was heated under stirring at 105° C. so as to solve. After stirring for an hour, the resultant solution was introduced into a spray-tower with compressed nitrogen gas (1.1 MPa) heated to 105° C., by use of a two-fluid spray nozzle. The flow rate of the nitrogen gas was 38 l/minute. In the spray-tower, liquid nitrogen was introduced as a coolant so as to maintain the interior temperature of the tower at −15° C. The product was collected into cooled hexane introduced at the bottom of the tower, to thereby yield 256 g. Analysis of the product showed that the composition of the product serving as a carrier is MgCl$_2$.6EtOH, which is identical to that of the starting solution.

In order to use the product as a carrier, the above product was sieved to thereby obtain a spherical particle-form carrier (205 g) having a particle diameter of 45–212 μm. The obtained carrier was subjected to through-flow drying at room temperature for 181 hours by use of nitrogen at a flow rate of 3 l/minutes to thereby obtain a dry carrier having a composition of MgCl$_2$.1.7EtOH.

In a glass flask, the dry carrier (20 g), titanium tetrachloride (160 ml), and purified 1,2-dichloroethane (240 ml) were mixed and the mixture was heated at 100° C. under stirring. Subsequently, diisobutyl phthalate (6.8 ml) was added to the mixture. The mixture was further heated at 100° C. for 2 hours. After the liquid phase was removed by decantation, additional titanium tetrachloride (160 ml) and purified 1,2-dichloroethane (320 ml) were added. The resultant mixture was maintained at 100° C. for 1 hour, and the liquid phase was subsequently removed by decantation. The residue was washed with purified hexane and dried to thereby obtain a titanium-containing solid catalyst component. The obtained titanium-containing solid catalyst component: A-1 had an average particle diameter of 115 μm, and elemental analysis showed the following composition; Mg: 19.5 wt. %, Ti: 1.6 wt. %, Cl: 59.0 wt. %, and diisobutyl phthalate: 4.5 wt. %.

(2) Preliminary Polymerization

In a stainless steel reactor equipped with inclined fans (internal volume: 5 l), air was purged by use of nitrogen gas, and n-hexane (2.8 l), triethylaluminum (organometallic compound (AL1), 4 mmol), and the titanium-containing carrier-type-catalyst component prepared in the above (9.0 g, 5.26 mmol as reduced to titanium atoms) were placed therein. Propylene (20 g) was fed thereto and preliminary polymerization was carried out at −2° C. for 10 minutes.

Separately, a polymer produced through the preliminary polymerization in the same conditions was analyzed. The results show that 2 g of propylene was converted to polypropylene (B) per g of the titanium-containing carrier-type-catalyst component and that the intrinsic viscosity [η]$_B$ of polypropylene (B) in tetralin at 135° C. is 2.8 dl/g.

(3) Preliminary Activation of the Catalyst

After completion of preliminary polymerization, unreacted propylene was removed from the reactor to the outside and a gas phase in the reactor was purged once by use of nitrogen gas. Subsequently, while the interior temperature of the reactor was maintained at −1° C., ethylene was continuously fed into the reactor for 2 hours so as to maintain the pressure in the reactor at 0.59 MPa, and polymerization for preliminary activation was carried out.

Separately, a polymer produced through polymerization for preliminary activation under the same conditions was analyzed. The results show that 24 g of a polymer was produced per g of the titanium-containing carrier-type-catalyst component and that the intrinsic viscosity [η]$_{T2}$ of the polymer in tetralin at 135° C. is 31.4 dl/g.

The weight of polyethylene (A) produced through polymerization of ethylene for preliminary activation per g of the titanium-containing carrier-type-catalyst component, (W$_2$), is calculated as the difference between the amount of polymers produced after preliminary activation treatment (W$_{T2}$) and the amount of polypropylene (B) produced after the preliminary polymerization (W$_1$) per g of the titanium-containing carrier-type-catalyst component, according to the following equation.

$$W_2 = W_{T2} - W_1$$

The intrinsic viscosity of the polyethylene (A) produced from polymerization of ethylene for preliminary activation, [η]$_E$, is calculated from the intrinsic viscosity of the polypropylene (B) produced through preliminary polymerization, [η]$_B$, and that of a polymer produced through preliminary activation treatment, [η]$_{T2}$, according to the following equation.

$$[\eta]_E = ([\eta]_{T2} \times W_{T2} - [\eta]_B \times W_1) / (W_{T2} - W_1)$$

According to the above equation, the weight of the polyethylene (A) produced through polymerization of ethylene for preliminary activation is 22 g based on 1 g of the titanium-containing carrier-type-catalyst component, and the intrinsic viscosity [η]$_E$ is 34.0 dl/g.

After completion of reaction, unreacted ethylene was removed from the reactor to the outside and a gas phase in the reactor was purged once by use of nitrogen gas. After di-i-propyldimethoxysilane (electron donor (E1), 1.6 mmol) was added, propylene (20 g) was fed and the mixture was maintained at 1° C. for 10 minutes to thereby carry out addition polymerization after preliminary activation treatment.

Separately, a polymer produced through addition polymerization under the same conditions was analyzed. The results show that 26 g of a polymer was produced based on 1 g of the titanium-containing carrier-type-catalyst component, and that the intrinsic viscosity $[\eta]_{T3}$ of the polymer in tetralin at 135° C. is 29.2 dl/g.

From the results, calculated according to the above-described equations, the weight of polypropylene (D) produced through addition polymerization ($W_3$) is 2 g based on 1 g of the titanium-containing carrier-type-catalyst component, and the intrinsic viscosity $[\eta]_D$ is 2.8 dl/g.

After completion of reaction, unreacted propylene was removed from the reactor to the outside and a gas phase in the reactor was purged once by use of nitrogen gas to thereby obtain a preliminarily activated catalyst for main polymerization.

(4) Production of Propylene Homopolymer (b)

The preliminarily activated catalyst prepared in the above-described manner, triethylaluminum (organometallic compound (AL2)), and di-i-propyldimethoxysilane (electron donor (E2)) were continuously fed to a first-stage reactor of a gas phase multi-stage polymerization reactor. Propylene was continuously fed such that the following reaction conditions were maintained: reaction temperature of 70° C.; reaction pressure of 2.5 MPa; and agitation speed of 40 rpm. In addition, hydrogen gas was continuously fed in order to control the molecular weight of the formed propylene homopolymer. The intrinsic viscosity and melt flow rate of the formed propylene homopolymer were controlled by adjusting the hydrogen concentration in the gas phase of the polymerization reactor. The formed propylene homopolymer was intermittently sampled, and the obtained samples were subjected to measurement. In such a manner, a predetermined amount of propylene was homopolymerized.

(5) Production of Ethylene-propylene Copolymer

Next, the formed propylene homopolymer and an ethylene-propylene gas mixture were continuously fed to a second-stage reactor of the polymerization reactor, to thereby copolymerize ethylene and propylene. Reaction conditions were as follows: reaction temperature of 60° C.; reaction pressure of 2.1 MPa; and agitation speed of 40 rpm. In the gas phase, the molar ratio of ethylene to propylene and that of hydrogen to ethylene were adjusted. In order to control the amount of the ethylene-propylene copolymer formed through polymerization, carbon monoxide was fed as a polymerization inhibitor and hydrogen gas was fed in order to control the molecular weight of the formed ethylene-propylene copolymer. Thus, a predetermined amount of an ethylene-propylene copolymer was produced through polymerization.

Comparative Example 1

The procedure of Example 1 was repeated except that preliminary activation and addition polymerization were not carried out, to thereby produce a propylene homopolymer and an ethylene-propylene copolymer.

A variety of obtained polypropylene compositions are shown in Table 1.

To powder (4 kg) of each propylene composition shown in Table 1, 1,3-tris(2-methyl-4-hydroxy-5-t-butylphenyl) butane (0.004 kg) and calcium stearate (0.004 kg) were added as antioxidants. The mixture was mixed well at room temperature for 10 minutes by use of a high-speed agitation-type mixer (trade name: Henschel Mixer), followed by granulation by use of an extrusion granulator (screw diameter of 40 mm).

Subsequently, the obtained granules were subjected to extrusion molding machine at a resin melting temperature of 230° C. and a die temperature of 50° C. to thereby produce test pieces as specified by JIS K7713 and K6758. The test pieces were conditioned for 72 hours in a room (50% humidity, 23° C.) and subjected to evaluation.

The test pieces were evaluated according to the following test methods, and the results are shown in Table 1.

Resistance to whitening by impact: measured by loading test conducted under the below-described conditions for the planer samples (50×50×2 mm) as prepared in the above-described manner by use of a Du Pont Impact Tester (manufactured by Toyo Seiki Seisakusho), and the diameter of the whitening point caused by impact was measured.

tip of firing pin: 0.635 cm R;

internal diameter of cradle: 3.81 φ;

load: 500 g; and falling height of the load: 1 m.

Resistance to whitening by bending: measured by the following method. The above-described granules were subjected to T-die-casting by use of a sheet-molding machine having a T-die and a polishing roll, under the following conditions: extrusion temperature of 230° C.; cooling-roll temperature of 50° C.; and molding speed of 2 mm/minute. The formed sheet having a thickness of 0.6 mm was cut to the dimensions of 10 mm (TD direction) in width and 120 mm (MD direction) in length, to thereby obtain test pieces to be measured for resistance to whitening by bending. The two ends of the test piece were gradually bent so as to be brought close to each other until whitening developed at the bending portion. When whitening developed, the curvature at the bending portion was measured, and the diameter of a circle having a curvature corresponding to the thus-measured curvature served as an index of whitening. The smaller the index values, the greater the resistance to whitening by bending.

Izod impact strength: measured in accordance with JIS K-6758.

Molding shrinkage: calculated according to the following formula: the ratio of the difference obtained by subtracting the overall length of the test piece (JIS K-7113 test piece for tensile test) prepared as described above from :the overall length of die to the overall length of the die was obtained, then multiplied by 100.

molding shrinkage={[(overall length of die)−(overall length of test piece)]/(overall length of die)}×100   Equation 5

Haze: measured in accordance with ASTM D1003 by use of planer samples (25×50×1 mm)

Observation of the above-described test pieces and sheets under an electron microscope revealed that ethylene-propylene copolymer domains (island) were dispersed in a propylene homopolymer matrix (sea) and polyethylene having a high molecular weight was predominantly dispersed in the matrix. Therefore, polypropylene compositions having high melt tension were found to be produced.

The amount of the ethylene-propylene copolymer domain was greater in the polypropylene composition of the second mode of the present invention than in the polypropylene composition of the third mode of the present invention.

TABLE 1

| | Ex. 1 | Ex. 2 | Ex. 3 | Ex. 4 | Ex. 5 | Ex. 6 | Comp. Ex. 1 |
|---|---|---|---|---|---|---|---|
| Preliminary Polymerization | | | | | | | |
| Polypropylene (B) | | | | | | | |
| Intrinsic viscosity (dl/g) | 2.8 | 2.8 | 2.8 | 2.8 | 2.8 | 2.8 | 2.8 |
| Amount formed (g/g) | 2.0 | 2.0 | 2.0 | 2.0 | 2.0 | 2.0 | 2.0 |
| Compositional ratio (wt %) | 0.02 | 0.02 | 0.02 | 0.02 | 0.02 | 0.02 | 0.02 |
| Preliminary Activation | | | | | | | |
| Polyethylene (A) | | | | | | | |
| Intrinsic viscosity (dl/g) | 34.0 | 34.0 | 34.0 | 34.0 | 34.0 | 34.0 | — |
| Amount formed (g/g) | 22.0 | 22.0 | 22.0 | 22.0 | 22.0 | 22.0 | 0 |
| Compositional ratio (wt %) | 0.25 | 0.25 | 0.25 | 0.25 | 0.25 | 0.25 | 0 |
| Addition Polymerization | | | | | | | |
| Polypropylene (D) | | | | | | | |
| Intrinsic viscosity (dl/g) | 2.8 | 2.8 | 2.8 | 2.8 | 2.8 | 2.8 | — |
| Amount formed (g/g) | 2.0 | 2.0 | 2.0 | 2.0 | 2.0 | 2.0 | 0 |
| Compositional ratio (wt %) | 0.02 | 0.02 | 0.02 | 0.02 | 0.02 | 0.02 | 0 |
| Main Polymerization | | | | | | | |
| Propylene homopolymer (b) | | | | | | | |
| Intrinsic viscosity (dl/g) | 2.5 | 2.5 | 2.0 | 2.5 | 2.3 | 1.8 | 1.9 |
| Compositional ratio (wt %) | 59.83 | 49.86 | 57.33 | 71.29 | 70.79 | 71.09 | 78.88 |
| Melt flow rate (g/10 min) | 0.8 | 0.8 | 3.0 | 0.8 | 1.5 | 6.0 | 5.0 |
| **Eth-prop. copolymer* (C)** | | | | | | | |
| Ethylene content (wt %) | 41 | 34 | 40 | 35 | 35 | 35 | 58 |
| Compositional ratio (wt %) | 39.88 | 49.85 | 42.38 | 28.41 | 28.92 | 28.62 | 21.1 |
| Intrinsic viscosity (dl/g) | 2.5 | 2.5 | 2.0 | 2.5 | 2.3 | 1.8 | 2.6 |
| Melt flow rate (g/10 min) | 0.8 | 0.8 | 3.0 | 0.8 | 1.5 | 6.0 | 0.7 |
| Propylene Composition | | | | | | | |
| $MFR_{WHOLE}$ (g/10 min) | 0.8 | 0.8 | 3.0 | 0.8 | 1.5 | 6.0 | 3.3 |
| $[\eta]_{WHOLE}$ (dl/g) | 2.5 | 2.5 | 2.0 | 2.58 | 2.38 | 1.88 | 1.9 |
| PP/RC wt. ratio ($W_{PP}/W_{RC}$) | 1.5 | 1.0 | 1.35 | 2.51 | 2.45 | 2.48 | 3.74 |
| $MFR_{PP}/MFR_{RC}$ | 1.0 | 1.0 | 1.0 | 1.0 | 1.0 | 1.0 | 7.1 |
| $[\eta]_{RC}/[\eta]_{PP}$ | 1.1 | 1.0 | 1.05 | 1.0 | 1.0 | 1.0 | 1.37 |
| $[\eta]_{RC}/[\eta]_{PP} \times W_{PP}/W_{RC}$ | 1.65 | 1.0 | 1.4 | 2.51 | 2.45 | 2.48 | 5.1 |
| Properties | | | | | | | |
| Molding shrinkage (%) | 1.1 | 0.7 | 1.0 | 0.96 | 0.98 | 0.99 | 1.39 |
| Whitening by impact (mmφ) | 0 | 0 | 0 | 6.7 | 7.3 | 7.2 | 17.9 |
| Whitening by bending (mmφ) | <3 | <3 | <3 | <3 | <3 | <3 | 18 |
| Izod Impact (kJ/m²) | >60 | >60 | 60 | 14.5 | 14.0 | 12.5 | 7.5 |
| Haze (%) | 55 | 63 | 50 | 48 | 45 | 44 | 90 |
| Melt tension (MS) (cN) | 4.0 | 3.8 | 1.9 | 4.0 | 2.49 | 0.92 | 0.75 |

*:Eth-prop. Copolymer: Ethylene-propylene copolymer

Industrial Applicability

As described hereinabove, the polypropylene composition of the present invention has high melt tension, a high crystallization temperature, and excellent thermal stability and provides a molded article having excellent transparency, excellent resistance to whitening by impact or bending, and low molding shrinkage. Therefore, the polypropylene composition has excellent moldability with respect to techniques such as blow molding, expansion molding, and extrusion molding, and high-speed productivity of a molded article through other molding techniques is enhanced. The composition is useful as a raw material for a variety of molded articles.

What is claimed is:

1. A polypropylene composition comprising 0.01–5 parts by weight of an olefin (co)polymer (a), 100 parts by weight of a propylene homopolymer (b), and 28–300 parts by weight of an ethylene-propylene copolymer (c), wherein the product, $([\eta]_{RC}/[\eta]_{PP}) \times (W_{PP}/W_{RC})$, of the ratio of the intrinsic viscosity of the ethylene-propylene copolymer (c) to that of the propylene homopolymer (b) represented by $[\eta]_{RC}/[\eta]_{PP}$ and the ratio of the weight of propylene homopolymer (b) to that of the ethylene-propylene copolymer (c) represented by $W_{PP}/W_{RC}$ falls within the range of 0.2–3.0;

the olefin (co)polymer (a) having an intrinsic viscosity as measured in tetralin at 135° C. and represented by $[\eta]_E$ of 15–100 dl/g;

the propylene homopolymer (b) having an intrinsic viscosity as measured in tetralin at 135° C. and represented by $[\eta]_{PP}$ of 0.2–15 dl/g; and the ethylene-propylene copolymer (c) having an intrinsic viscosity as measured in tetralin at 135° C. and represented by $[\eta]_{RC}$ of 0.2–10 dl/g.

2. A polypropylene composition according to claim 1, wherein the ratio of the ethylene-propylene copolymer (c) to the propylene homopolymer (b) is 50–300 parts by weight/ 100 parts by weight; the ratio of the melt flow rate of the propylene homopolymer (b) to that of the ethylene-propylene copolymer (c) represented by $MFR_{PP}/MFR_{RC}$ is 0.3–4; and the product represented by $([\eta]_{RC}/[\eta]_{PP}) \times (W_{PP}/W_{RC})$ falls within the range of 0.2–2.0.

3. A polypropylene composition according to claim 1, wherein the ratio of the ethylene-propylene copolymer (c) to the propylene homopolymer (b) is 28–160 parts by weight/100 parts by weight; the ratio represented by $[\eta]_{RC}/[\eta]_{PP}$ is 0.7–1.2; and the product represented by $([\eta]_{RC}/[\eta]_{PP}) \times (W_{PP}/W_{RC})$ falls within the range of 1.0–3.0.

4. A process for producing a polypropylene composition comprising the steps of:

(co)polymerizing, ethylene or a mixture of ethylene and at least one other olefin to form 0.01–5 parts by weight of an olefin (co)polymer having an intrinsic viscosity as measured in tetralin at 135° C. and represented by $[\eta]_E$ of 15–100 dl/g (a);

polymerizing propylene to form 100 parts of a propylene homopolymer having an intrinsic viscosity as measured in tetralin at 135° C. and represented by $[\eta]_{PP}$ of 0.2–15 dl/g, (b); and copolymerizing a mixture of ethylene and propylene to form 28–300 parts by weight of an ethylene-propylene copolymer having an intrinsic viscosity as measured in tetralin at 135° C. and represented by $[\eta]_{RC}$ of 0.2–10 dl/g, (c), and to thereby form the composition, $([\eta]_{RC}/[\eta]_{PP}) \times (W_{PP}/W_{RC})$, of the ratio of the intrinsic viscosity of the ethylene-proplyene copolymer (c) to that of the propylene homopolymer (b) represented by $[\eta]_{RC}/[\eta]_{PP}$ and the ratio of the weight of propylene homopolymer (b) to that of the ethylene-propylene copolymer (c) represented by $W_{PP}/W_{RC}$ falls within the range of 0.2–3.0, wherein the above steps are performed in the presence of a catalyst for producing polyolefin comprising a transition metal compound catalyst component containing at least a titanium compound, an organometallic compound of a metal selected from the group consisting of metals belonging to Group I, Group 2, Group 12, and Group 13, and an optional electron donor.

5. A process for producing a polypropylene composition according to claim 4, wherein the organometallic compound is used in an amount of 0.01–1,000 mol per mol of transition metal atoms and the optional electron donor is used in an amount of 500 mol or less per mol of transition metal atoms.

6. A process for producing a polypropylene composition according to claim 4, comprising the steps of:

preliminarily polymerizing propylene and subsequently forming the olefin (co)polymer (a) through polymerization to thereby preliminarily activate a catalyst;

forming the propylene homopolymer (b); and subsequently forming the ethylene-propylene copolymer (c).

7. A process for producing a polypropylene composition according to claim 6, comprising the steps of:

forming the olefin (co)polymer (a) through polymerization to thereby preliminarily activate a catalyst;

addition-polymerizing propylene; and subsequently forming the propylene homopolymer (b).

* * * * *